May 17, 1932.    E. L. WERFT ET AL    1,858,606
MULTIPLE TEMPERATURE CONTROL FOR HEATING AND VENTILATING UNITS
Filed April 17, 1930    4 Sheets-Sheet 1
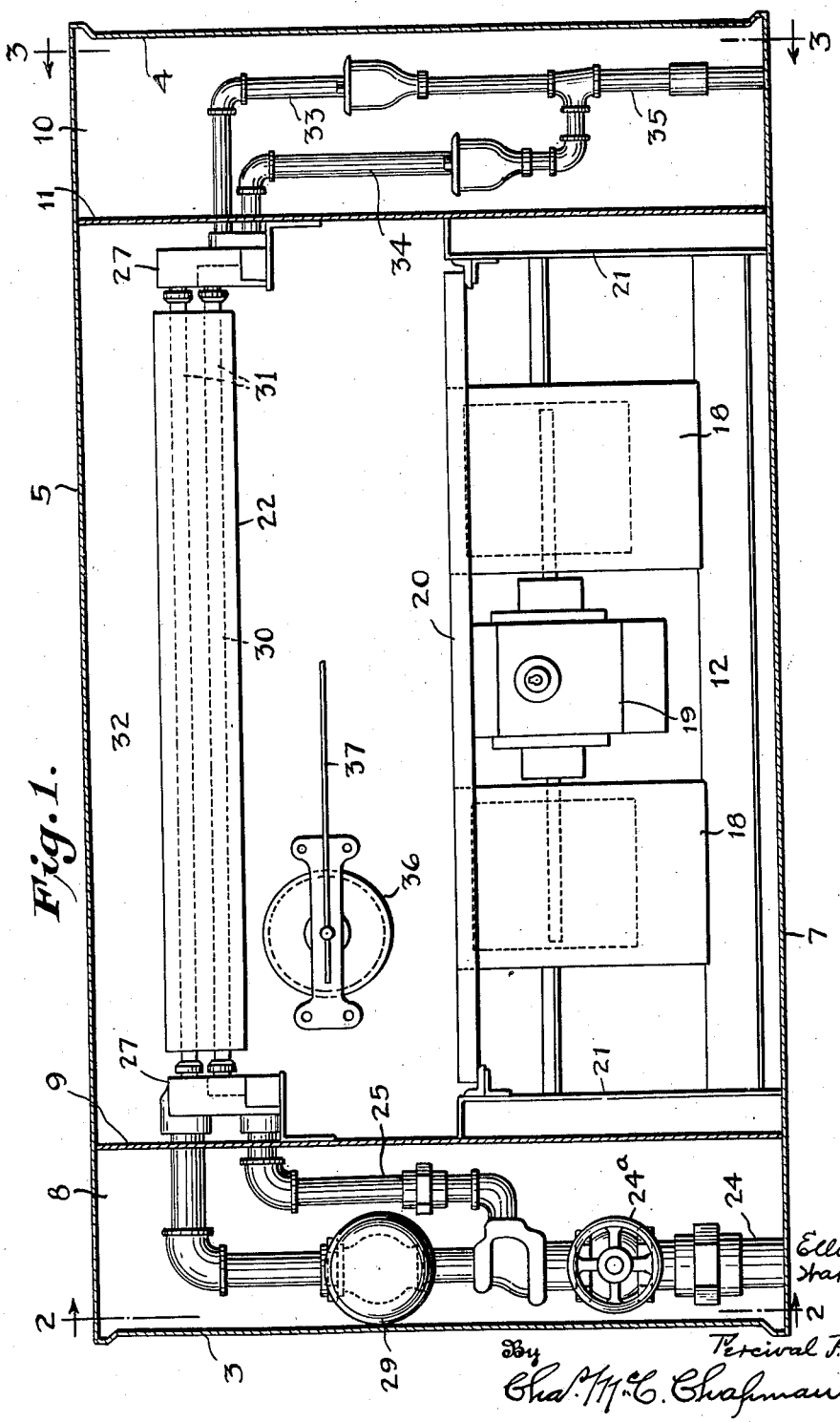

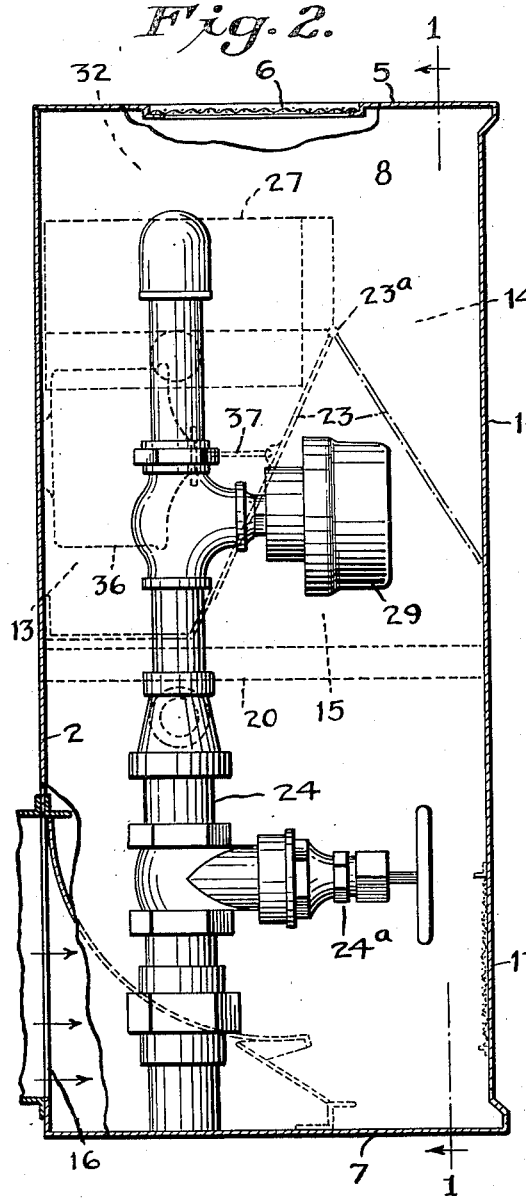
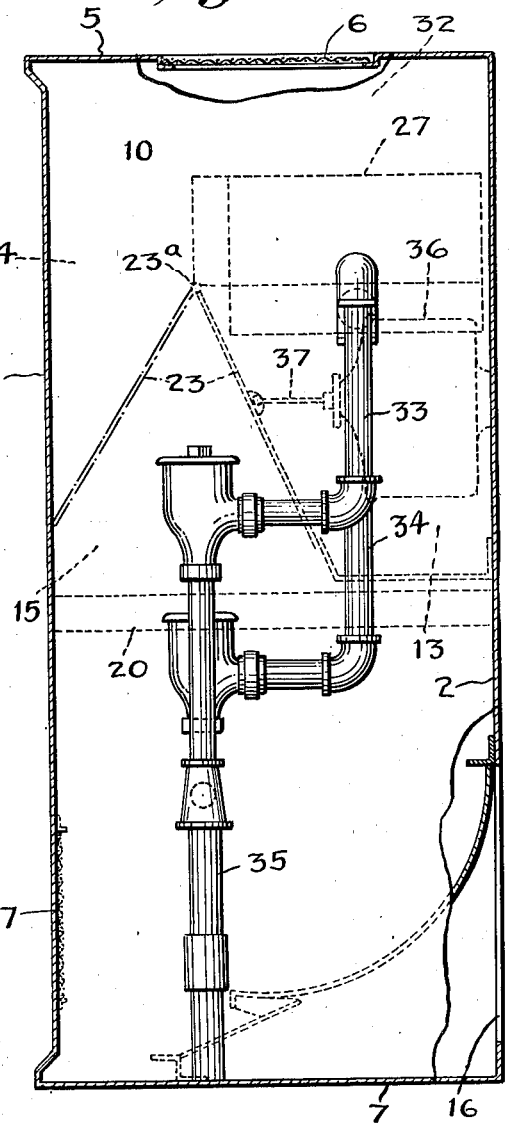

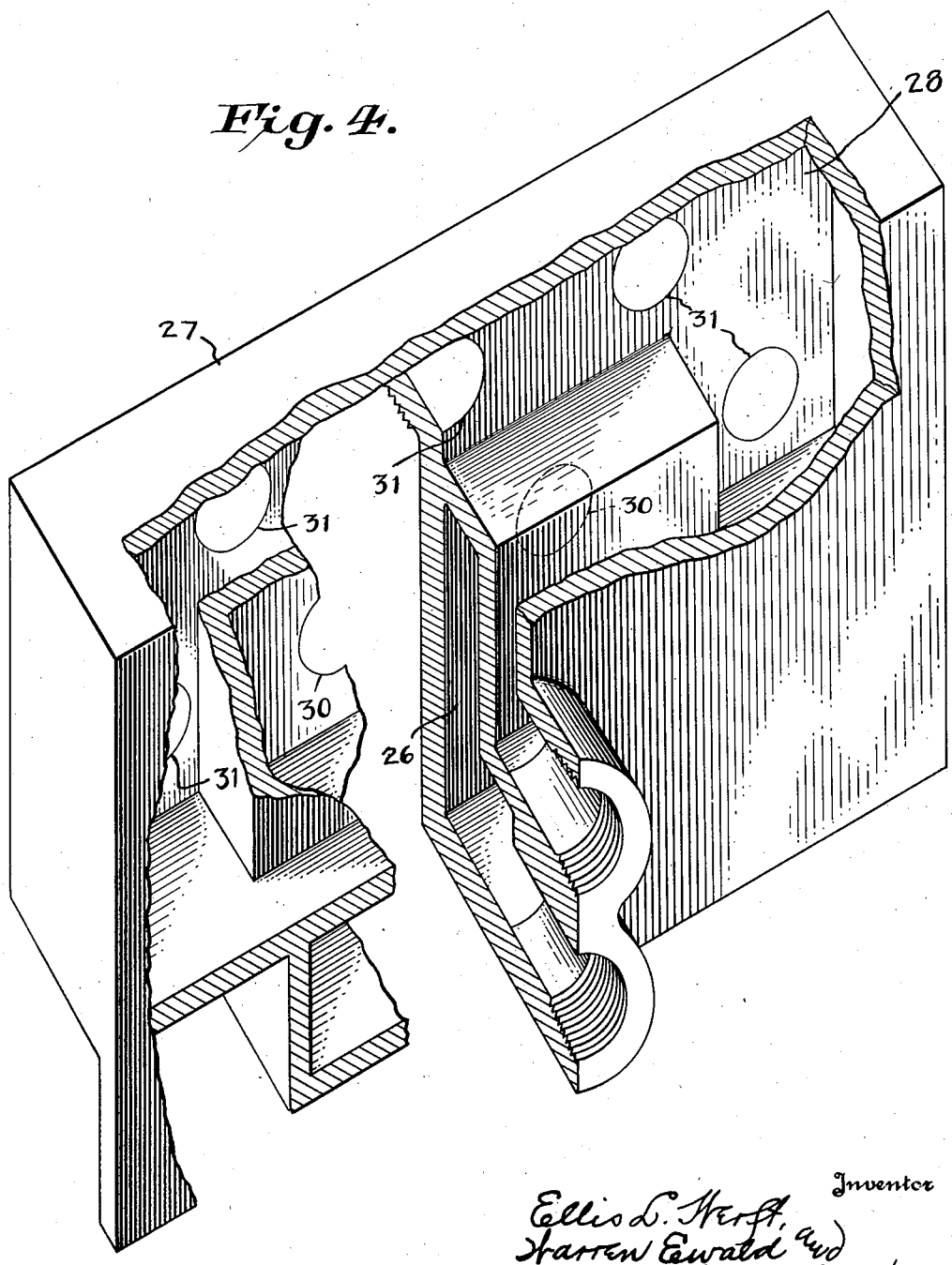

May 17, 1932.  E. L. WERFT ET AL  1,858,606
MULTIPLE TEMPERATURE CONTROL FOR HEATING AND VENTILATING UNITS
Filed April 17, 1930   4 Sheets-Sheet 4
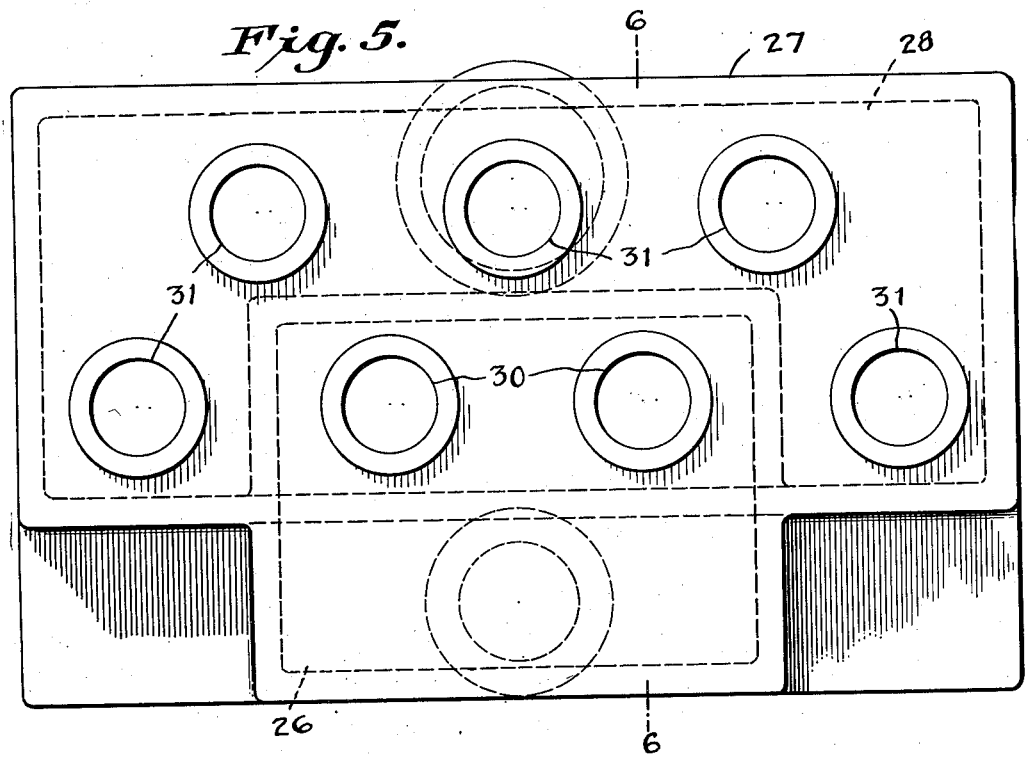
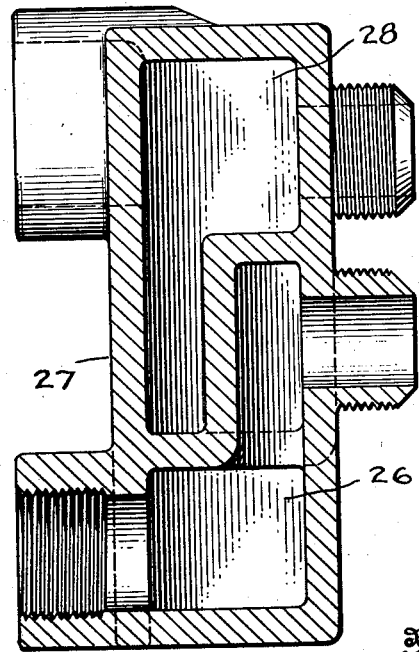

Patented May 17, 1932

1,858,606

UNITED STATES PATENT OFFICE

ELLIS L. WERFT, OF PHILADELPHIA, WARREN EWALD, OF ARDSLEY, AND PERCIVAL P. HENSHALL, OF PHILADELPHIA, PENNSYLVANIA, ASSIGNORS TO JOHN J. NESBITT, INC., OF HOLMESBURG, PENNSYLVANIA, A CORPORATION OF NEW JERSEY

MULTIPLE TEMPERATURE CONTROL FOR HEATING AND VENTILATING UNITS

Application filed April 17, 1930. Serial No. 445,108.

This invention has reference to the art of heating and ventilating large spaces such as school houses, apartments, public buildings and other similar structures, and particularly relates to a means in conjunction with a heating and ventilating unit by which the temperature of the air discharged therefrom may be regulated so as to avoid excessive heat, excessive cold, and provide for exact predetermined temperature in the room of installation of the unit.

Among the objects of our invention may be noted the following: to provide a heating and ventilating unit with a means by which the heating element can be regulated as to temperature, in combination with a means by which the air passing through the unit may be regulated as to temperature, both of said means being regulatable either by hand or automatically; to provide a heating and ventilating unit with a double control system of means by which the air discharged into the room of installation may be controlled to a nicety and to avoid overheating of the room temperature; to provide a heating and ventilating unit with a radiator so constructed as to divide the steam supplied thereto into two independent bodies which may be controlled so as to regulate the temperature of the heating element; to provide a heating and ventilating unit with a form of heating element which enables comparatively sudden cooling thereof and equally sudden heating thereof under control; to provide a heating and ventilating unit with a heating element of a type such that the flow of steam thereto may be regulated to a considerable extent automatically so as to control the temperature of the air discharged from the unit; to provide a combination of elements and means under thermostatic or automatic control by which the temperature of the air passing through the unit may be regulated as well as the temperature of the heating element of the unit.

With the above objects in view and others which will be detailed during the course of this description, our invention consists in the parts, features, elements and combinations thereof hereinafter described and claimed.

In order that our invention may be clearly understood, we have provided drawings wherein:

Figure 1 is a view in front elevation of a heating and ventilating unit embodying our invention, the face plate of the unit being removed, and also the mixing damper, giving the effect of a view as upon the line 1—1 of Figure 2;

Figure 2 is a vertical sectional view taken on the line 2—2 of Figure 1;

Figure 3 is a vertical sectional view taken on the line 3—3 of Figure 1;

Figure 4 is a perspective view, with parts broken out, of the return header of the heating element;

Figure 5 is a side elevation of the supply header of the heating element; and

Figure 6 is a sectional view taken on the line 6—6 of Figure 1.

Referring to the drawings, it will be seen that our heating and ventilating unit, generally speaking, comprises an enclosing casing containing a motor, a plurality of blowers driven by the motor, a heating element, and a bypass damper, the latter being so located as to control the passage of air, directionally, through the unit. The heating element has important characteristics; the supply of fluid for the heating element is under control, partly automatic; the bypass damper is under control automatically; and the blowers are driven by the motor which is inserted in a predetermined circuit or is supplied by suitable power mains.

Referring particularly to Figures 1, 2 and 3, it will be seen that the casing is composed of the front wall 1, rear wall 2, end walls 3 and 4, respectively, and a top wall 5 or deck, which is provided with a discharge opening 6, preferably covered by a grille, through which the air is discharged into the room of installation of the unit. The casing may be provided with a bottom member 7, though this may be dispensed with, if desired. The interior of the casing is divided into a chamber 8 at one end thereof produced by the end wall 3 of the casing and a partition 9 suitably spaced from said end wall; a chamber 10 produced by the end wall 4 and the partition 11 spaced from the end wall 4. The chamber 8 constitutes the feed end of the casing, and the chamber 10 constitutes the return end of the casing. Between the two compartments 8 and 10, the casing is divided into a motor and blower chamber 12 at the bottom of the casing, a heating chamber 13 near the top of the casing and at the back thereof, a bypass chamber 14 adjacent the heating chamber and at the front of the casing, a cold air chamber 15 below the heating chamber and above the motor and blower chamber. The casing at its bottom is provided with a cold air inlet 16 at the rear and a recirculating inlet 17 at the front. The blowers and the motor may be supported in any suitable way in the chamber 12, as shown in Figure 1, these elements being conventionally shown and generally indicated, the blowers by 18 and the motor by 19, all supported by a board or partition 20 suspended at opposite ends upon the uprights 21. The heating element is indicated at 22, and the bypass or mixing damper at 23, the latter being pivotally mounted at 23ª by its upper edge, enabling it to swing in the arc of a circle within the cold air chamber 15 so as to control the passage of air driven upwardly by the blowers so as to cause the air to pass entirely through the heating chamber 13, or entirely through the bypass chamber 14, or partly through the latter and the heating chamber.

The chamber 8 at the feed end of the casing has erected therein a steam supply conduit 24 controlled by a manually manipulated valve 24ª. Above the valve the conduit 24 is tapped by a bypass conduit 25, the delivery end of which is tapped into the lower chamber 26 of the header 27 of the heating element or radiator 22. The discharge end of the conduit 24 is tapped into the upper chamber 28 of the header 27, and below said discharge end said conduit is provided with a valve operated by thermostatic means under control of the usual sylphon regulator 29, which may be of either the Powers or Johnson type. It will thus be seen that the steam supply through conduit 24 may be controlled or entirely cut off by the hand valve 24ª, and automatically controlled by the sylphon regulator thermostatically controlled. This will enable the supply of steam above the sylphon controlling means to be regulated in a predetermined manner by adjustment of the thermostatic regulator. On the other hand, the bypass conduit 25 will, as long as the valve 24ª is open, discharge steam into the header 27 or into the chamber 26 thereof.

Referring now to Figures 4 to 6, inclusive, it will be seen that the heating element 22 consists of two like headers 27 partitioned to provide the small chamber 26 and the large chamber 28. These two headers are connected by a plurality of tubes 30 which communicate with the smaller chamber 26 supplied by the bypass conduit 25, and a greater number of tubes 31 communicating with the larger chamber 28 supplied by the conduit 24. The important feature of this part of our invention is that the two chambers are isolated as well as the two sets of tubes 30 and 31, and that the latter may be entirely cut off from steam supply, while the former is always supplied by steam provided the hand valve 24ª is open. Hence, there may be always a limited supply of steam to the heating element, while the larger supply of steam to the heating element may be regulated or entirely cut off under thermostatic control of the sylphon operator 29. Another important feature of the radiator or heating element is that the chamber 26 may be supplied with any number of tubes, while the chamber 28 will be supplied always with a much greater number of tubes the latter surrounding approximately the tubes connecting the chambers 26. Hence, although the tubes 31 and the chambers connected by the same may be cold, there will always be a supply of heat into the chambers 26 and through the tubes 30, under control, however, of the hand regulatable means. Thus, although the tubes 30 may become excessively heated, the air passing in contact with them will before discharge from the unit be somewhat cooled by contact with the tubes 31, provided the steam supply has been cut off through the operation of the sylphon regulator 29. It should be noted, comparing Figures 5 and 6 with Figure 4, that the headers 27 differ only in the position of the steam supply inlets and the condensation outlets; that is, the inlet for supply of steam from conduit 24 is at the top-center of the header and that for the supply of steam from the conduit 25 is at the bottom-center of the header, while the outlets for condensation are one over the other at the bottom-center of the header.

It will now be understood that, not only is the steam supply to the unit regulatable by hand and thermostatically and thus automatically; but, that the air passing through the unit can be controlled as to temperature either by hand regulation of the bypass damper or by automatic regulation thereof. That is to say, in Figures 2 and 3, a sylphon motor 36 with connections 37 to said damper are conventionally shown, it being understood that both the motors 29 and 36 are automatically controlled by thermostats arranged as desired. Consequently, the following important modes of operation will be appreciated.

Assuming the bypass or mixing damper, Figure 2, to be set at the extreme right, thus cutting off the bypass chamber and allowing all the air driven upwardly by the blowers to pass through the heating chamber in contact with the heating element, the air will be heated, according to the condition of the heating element and driven, without admixture with cold air in the mixing chamber 32, through the discharge grille 6 at the top of the unit. Assuming, further, that the valve 24ª is open, and that steam is passing without regulation into the header at the feed end of the radiator, through both the supply pipes 24 and 25, the heating element will be heated to its maximum, and the air discharged into the room of installation of the unit at maximum temperature. Under a rising room temperature, the thermostatic regulator will control the sylphon 29 in the conduit 24, thus gradually shutting off the supply of steam to the chamber 28 in the header at the feed end of the radiator and gradually reducing temperature of the larger group of tubes 31. The chamber 26 and the tubes 30, however, will be full of steam, unless the valve 24ª be shut off. However, hot air rising and radiation from tubes 30 will encounter the gradually cooling tubes 31 resulting in lowering the temperature of the air discharged through openings 6. Should the room temperature continue to rise, the bypass damper 23 will gradually shift, under thermostatic control, from the extreme right hand position of Figure 2, thus opening a passage into the bypass chamber 14, and permitting a part of the air to bypass the radiator and be mixed in the chamber 32 with the hot air passing through the radiator. This will tend to reduce the temperature of the air discharged through the top of the casing into the room of installation. If, nevertheless, the temperature in the room continues to rise, the bypass damper will continue to shift until it is in the extreme position at the left hand side of the cold air chamber shown in Figure 2, thereby allowing all the cold air driven by the blowers to bypass the radiator and be discharged, with admixture of radiation in chamber 32, into the room of installation, thus causing rapid reduction of room temperature.

Under a lowering room temperature, the bypass damper will shift from its extreme left hand position and gradually assume its extreme right hand position, thereby allowing the full heating capacity of the conduit 25 and smaller group of tubes of the heating element to be utilized. Upon a still further lowering of the room temperature, the thermostatically controlled valve 29, inserted in the conduit 24, will open, thereby allowing full head of steam to enter the header 27 and circulate through the larger group of tubes 31, giving full heating capacity of the radiator.

From the foregoing it will be clear that the unit of our invention has a wide range of temperature control, and that such control is not only of the air passing through the unit, but of the heating fluid passing through the radiator or heating element. It will also be clear that the controls are of such character that the temperature of the room of installation of the unit can be maintained automatically practically uniform throughout the operation of the system according to predetermination under thermostatic control and according to the temperature at which the thermostatic regulator is set. And it will be seen that room temperature can be controlled and maintained regardless of outdoor conditions of temperature and wind, and the room conditions are brought about without sudden alterations of temperature or creating drafts.

Broadly, our invention comprehends the idea of means and function wherein one radiator is controlled by a plurality of sources of fluid supply, the effects of which are combined with the effects produced by the automatic regulation of a mixing damper controlling the supply of air to the radiator, thus enabling maintenance of any desired room temperature without overheating or creating drafts.

The moisture of condensation gathers in the corresponding header at the return end of the radiator, the corresponding return pipes 33 and 34 containing separate traps and communicating with a common return conduit 35.

Having thus described our invention, what we claim and desire to secure by Letters Patent is:

1. A heating and ventilating unit having, in combination, a heating element, blower means and means for actuating the same, a mixing damper arranged adjacent the heating element, means for supplying fluid to the heating element including automatic and manual controlling means, means for adjusting the mixing damper relatively to the heating element including automatic controlling means, both automatic controlling means being actuated by the temperature surrounding the unit.

2. A heating and ventilating unit comprising a casing divided into a plurality of compartments, one at each end of the casing and extending throughout the height of the latter, and one at the top of the casing between the two end compartments, a radiator disposed in the top compartment, supply means connected to the radiator and located in one of the end compartments for conveying heated fluid to the radiator, and means in the other of the end compartments for conveying away from the radiator the moisture of condensation.

3. A heating and ventilating unit comprising a casing divided into a plurality of compartments, one at each end of the casing, one at the top of the casing between the end compartments, and one at the bottom of the casing between the end compartments, a radiator disposed in the top compartment, steam supply means in one of the end compartments connected to the radiator, return means in the other of the end compartments connected to the radiator for conveying off the moisture of condensation, a blower located in the bottom compartment adapted to drive air through and around the radiator, and an opening at the top of the casing for the discharge of said air.

4. A structure such as defined in claim 3 wherein a mixing damper is located between the radiator and the blower, and means for adjusting the mixing damper to control the passage of air through and around the radiator.

5. A structure such as defined in claim 3 wherein a mixing damper is disposed between the radiator and blower, and thermostatic means for regulating the position of the damper whereby to automatically control the passage of air to and around the radiator.

6. A structure such as defined in claim 3 wherein the steam supply means is provided with an automatically operated controller whereby to regulate the amount of steam conveyed to the radiator.

ELLIS L. WERFT.
WARREN EWALD.
PERCIVAL P. HENSHALL.